United States Patent
Dudar et al.

(10) Patent No.: US 11,780,291 B1
(45) Date of Patent: Oct. 10, 2023

(54) VEHICLE AIR CONDITIONER DRIP VALVE DIAGNOSTICS

(71) Applicant: Ford Global Technologies, LLC, Dearborn, MI (US)

(72) Inventors: Aed M. Dudar, Canton, MI (US); Mahmoud Yousef Ghannam, Canton, MI (US); Brian Bennie, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/817,056

(22) Filed: Aug. 3, 2022

(51) Int. Cl.
*B60H 1/00* (2006.01)
(52) U.S. Cl.
CPC ..... *B60H 1/00978* (2013.01); *B60H 1/00485* (2013.01)
(58) Field of Classification Search
CPC .............. B60H 1/3233; B60H 1/32331; B60H 1/00978; B60H 1/00485
See application file for complete search history.

(56) References Cited

U.S. PATENT DOCUMENTS

| 10,202,076 B2 | 2/2019 | Baek |
| 10,657,443 B2 | 5/2020 | Araujo et al. |
| 10,843,702 B2 | 11/2020 | Dudar |
| 2020/0173670 A1 | 6/2020 | Suzuki et al. |
| 2021/0268959 A1* | 9/2021 | Hu ........................... B05B 12/12 |
| 2022/0005210 A1* | 1/2022 | Raveendran ........... B60K 35/00 |

FOREIGN PATENT DOCUMENTS

KR    100398121 B1    9/2003

OTHER PUBLICATIONS

Bigelow, P., "Feds Want V2V Communication in New Cars Starting in 2021," Car and Driver, Dec. 15, 2016, 7 pages.

* cited by examiner

*Primary Examiner* — Nelson J Nieves
(74) *Attorney, Agent, or Firm* — Frank Lollo; Bejin Bieneman PLC

(57) ABSTRACT

A system and method for detecting a malfunction in a vehicle air conditioner (A/C) drip valve receives a trigger signal to initiate a vehicle A/C drip valve diagnostic for a vehicle, obtains a first image of a target area at a first time when the target area is dry, obtains a second image of the target area after operation of a vehicle A/C at a second time after the first time, compares the first image to the second image to determine a presence or absence of condensate from the vehicle A/C, and determines whether the vehicle A/C drip valve is malfunctioning based upon the comparison.

20 Claims, 8 Drawing Sheets

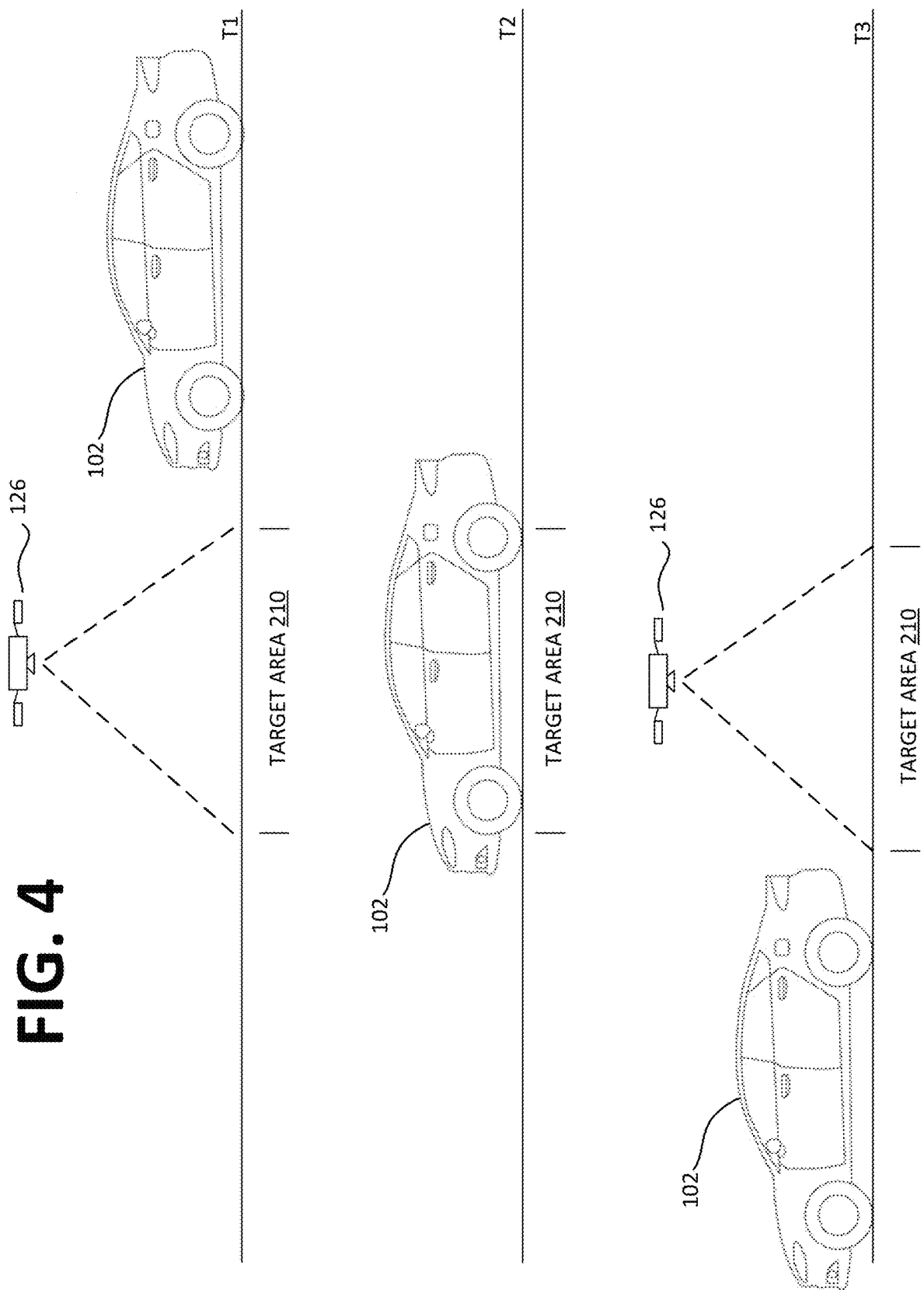

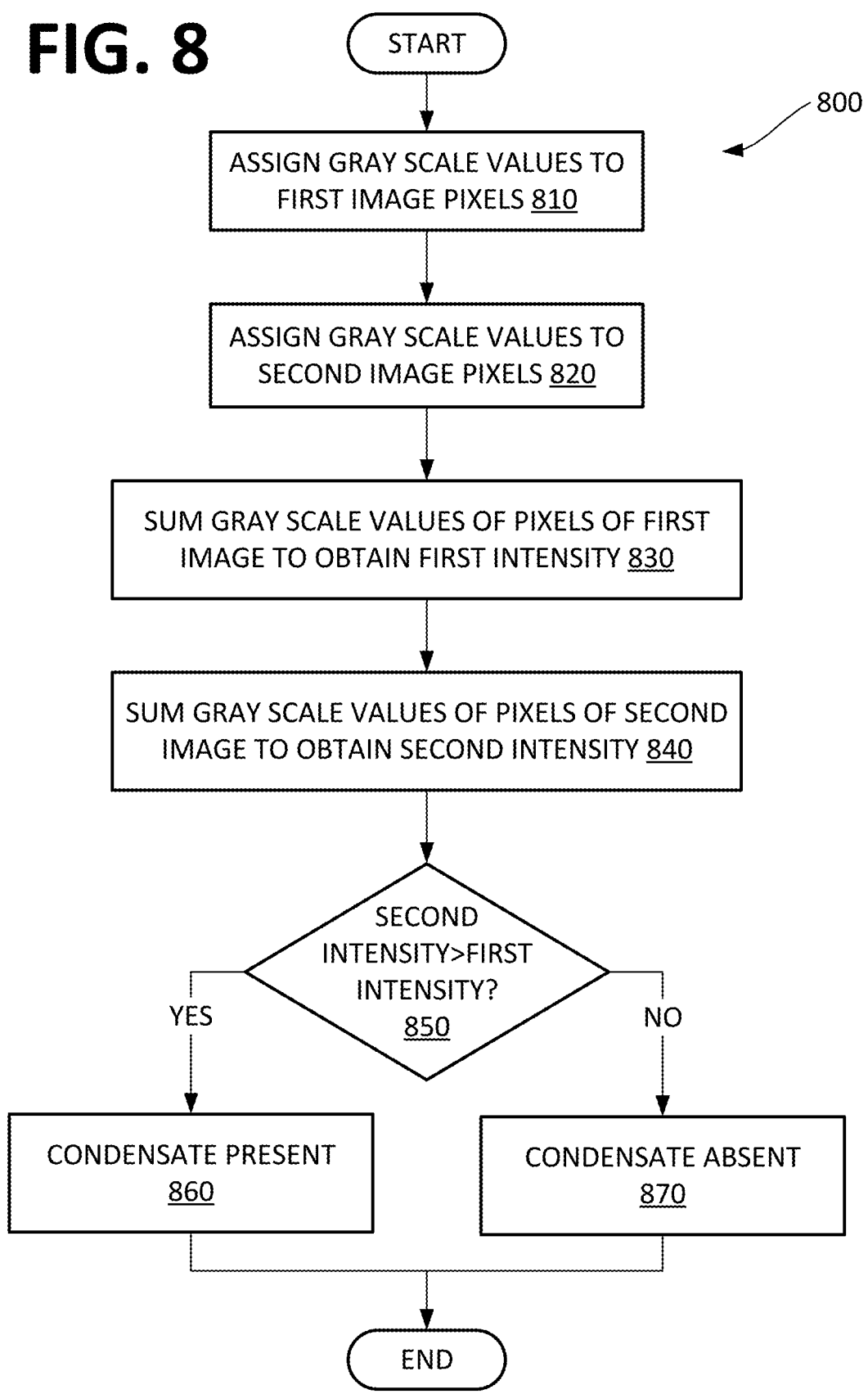

VEHICLE AIR CONDITIONER DRIP VALVE DIAGNOSTICS

BACKGROUND

Ground vehicles often include an air conditioner (A/C) for occupant comfort. Water vapor in the air being cooled condenses on the evaporator of the A/C, and the condensate is removed via an A/C drip valve to an exterior of the vehicle. If the A/C drip valve becomes clogged, condensate can collect and leak into the vehicle.

BRIEF DESCRIPTION OF THE DRAWINGS

FIG. 4 is a diagram of an example diagnostic procedure performed by an aerial drone.

FIG. 8 is a flow chart of an example image comparison process.

DETAILED DESCRIPTION

Figure 1:
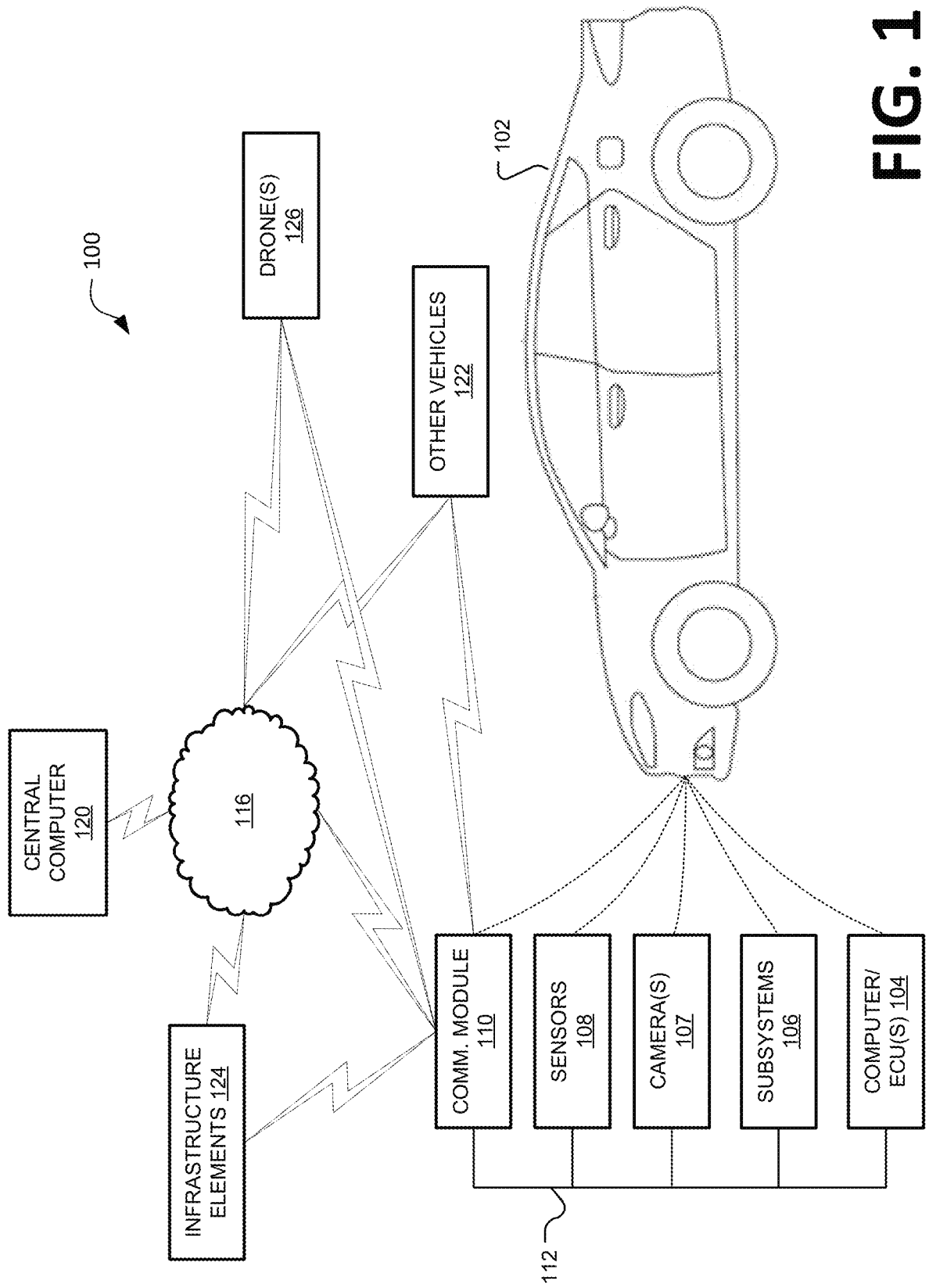
FIG. 1 is a diagram of an example system for diagnosing an A/C drip valve malfunction.

A proper functioning A/C drip valve will release condensate to an exterior of the vehicle where it will fall to the ground, forming a puddle if the vehicle is stationary or a wetting line of drops if the vehicle is moving. A blocked A/C drip valve will cause condensate to collect inside the vehicle rather than falling to the ground. Inside the vehicle, the collected condensate may slosh around (e.g., within the ducts), and make ingress into the passenger compartment, for example into a front passenger footwell due to the location of cabin air filter and recirculation inlet at that location.

A vehicle may use data from an interior air quality sensor (i.e., odor sensor), a humidity sensor, or an A/C pressure sensor to initiate a diagnostic for the A/C drip valve, or may have the diagnostic performed periodically or continuously during operation of the A/C. Interior cameras of the vehicle can image possible condensate ingress, and exterior cameras on the vehicle, on another vehicle, on infrastructure, on an aerial drone, or on combinations thereof can image possible condensate puddles or wetting lines outside the vehicle. By comparing images over time during A/C operation, the presence or absence of condensate may be detected and used to determine whether the A/C drip valve is functioning or not.

In one or more implementations, a system includes a computer having a processor and a memory storing instructions executable by the processor to obtain a first image of a target area that is exterior to a vehicle air conditioner (A/C) of a vehicle at a first time when the target area is dry, obtain a second image of the target area after operation of the vehicle A/C at a second time after the first time, compare the first image to the second image to determine a presence of condensate or an absence of condensate from the vehicle A/C, and make a determination whether an A/C drip valve is malfunctioning based upon the comparison and actuate a component based on the determination.

In an example, the instructions may include those to receive a trigger signal to initiate a vehicle air conditioner (A/C) drip valve diagnostic for the vehicle, wherein the trigger signal may be received based upon a vehicle sensor detecting at least one of an A/C pressure drop, unusual humidity, unusual odor, a condensate sloshing noise, or expiration of a time period.

In another example, the target area may be a vehicle support surface, the first image of the target area is obtained before the vehicle has been located over the target area, the second image of the target area is obtained after the vehicle has been located over the target area, and an A/C drip valve malfunction is determined based upon the comparison indicating the absence of condensate from the vehicle A/C.

In a further example, at least one of the first image or the second image may be captured by a camera on another ground vehicle, an infrastructure camera, or a camera on an aerial drone.

In yet another example, at least one of the first image or the second image may be captured by a camera on the vehicle.

In one or more example implementations, the computer may disposed in one of the vehicle, another ground vehicle, an infrastructure element, or an aerial drone.

In another example, the instructions to receive a trigger signal may include instructions to initiate vehicle air conditioner (A/C) drip valve diagnostics for a plurality of vehicles, and the first image and the second image for the plurality of vehicles are captured by a camera in an aerial drone.

In a further example, the first image and the second image may be infrared images.

In yet another example, the target area may be an interior vehicle surface where condensate from the vehicle A/C leaks when the A/C drip valve is clogged, and an A/C drip valve malfunction is determined based upon the comparison indicating the presence of condensate from the vehicle A/C.

In yet another example, the instructions to compare the first image to the second image may include instructions to assign gray scale values to pixels of the first image and the second image, with light pixels assigned a low value and dark pixels assigned a higher value, sum gray scale values of the pixels of the first image and the second image to obtain a respective first image intensity and a second image intensity, compare the first image intensity and the second image intensity, determine the presence of condensate when the second image intensity is greater than the first image intensity by a threshold amount, and determine the absence of condensate when the second image intensity is not greater than the first image intensity by a threshold amount.

In one or more implementations, a method for detecting a vehicle air conditioner (A/C) drip valve malfunction may include obtaining a first image of a target area that is exterior to a vehicle A/C of a vehicle at a first time when the target area is dry, obtaining a second image of the target area after operation of the vehicle A/C at a second time after the first time, comparing the first image to the second image to determine a presence of condensate or an absence of condensate from the vehicle A/C, and making a determination whether the vehicle A/C drip valve is malfunctioning based upon the comparison and actuating a component based on the determination.

Another example implementation may further include receiving a trigger signal to initiate a vehicle A/C drip valve diagnostic for a vehicle, wherein the trigger signal is received based upon at least one of detecting an A/C pressure drop, detecting unusual humidity within the vehicle, detecting unusual odor within the vehicle, detecting condensate sloshing noise within the vehicle, or expiring of a time period.

In an example, the target area may be a vehicle support surface, the first image of the target area is obtained before the vehicle has been located over the target area, the second image of the target area is obtained after the vehicle has been located over the target area, and the A/C drip valve malfunction is determined based upon the comparison indicating the absence of condensate from the vehicle A/C.

In an example, at least one of the first image or the second image may be captured by a camera on another ground vehicle, an infrastructure camera, or a camera on an aerial drone.

In another example, at least one of the first image or the second image may be captured by a camera on the vehicle.

In yet another example, the method may be performed by a computer in one of the vehicle, another ground vehicle, an infrastructure element, or an aerial drone.

In a further example, receiving the trigger signal may include initiating vehicle air conditioner (A/C) drip valve diagnostics for a plurality of vehicles, and the first image and the second image for the plurality of vehicles are captured by a camera in an aerial drone.

In an example, the first image and the second image may be infrared images.

In another example, the target area may be an interior vehicle surface where condensate from the vehicle A/C leaks when the A/C drip valve is clogged, and determining the vehicle A/C drip valve malfunction is based upon the comparison indicating the presence of condensate from the vehicle A/C.

In a further example, comparing the first image to the second image may include assigning gray scale values to pixels of the first image and the second image, with light pixels assigned a low value and dark pixels assigned a higher value, summing gray scale values of the pixels of the first image and the second image to obtain a respective first image intensity and a second image intensity, comparing the first image intensity and the second image intensity, determining the presence of condensate when the second image intensity is greater than the first image intensity by a threshold amount, and determining the absence of condensate when the second image intensity is not greater than the first image intensity by a threshold amount.

With reference to FIG. 1, a connected vehicle system 100 can provide communications between a vehicle 102, one or more other vehicles 122, infrastructure elements 124, and/or drones 126, and a central computer 120 to share data among the various entities.

Vehicle 102 is a set of components or parts, including hardware components and typically also software and/or programming, to perform a function or set of operations in the vehicle 102. Vehicle subsystems 106 typically include a braking system, a propulsion system, and a steering system as well as other subsystems including but not limited to a body control system, a climate control system, a lighting system, and a human-machine interface (HMI) system, which may include an instrument panel and/or infotainment system. The propulsion subsystem converts energy to rotation of vehicle 102 wheels to propel the vehicle 102 forward and/or backward. The braking subsystem can slow and/or stop vehicle 102 movement. The steering subsystem can control a yaw, e.g., turning left and right, maintaining a straight path, of the vehicle 102 as it moves.

Computers, including the herein-discussed one or more vehicle computers or electronic control units (ECUs) 104 (sometimes referred to herein as vehicle computer 104), processors in other vehicles 122, infrastructure elements 124, and/or drones 126, and central computer 120, include respective processors and memories. A computer memory can include one or more forms of computer readable media, and stores instructions executable by a processor for performing various operations, including as disclosed herein. For example, the computer can be a generic computer with a processor and memory as described above and/or an ECU, controller, or the like for a specific function or set of functions, and/or a dedicated electronic circuit including an ASIC that is manufactured for a particular operation, e.g., an ASIC for processing sensor data and/or communicating the sensor data. In another example, computer may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer.

A computer memory can be of any suitable type, e.g., EEPROM, EPROM, ROM, Flash, hard disk drives, solid state drives, servers, or any volatile or non-volatile media. The memory can store data, e.g., a memory of an ECU 104. The memory can be a separate device from the computer, and the computer can retrieve information stored in the memory, e.g., one or more computers/ECUs 104 can obtain data to be stored via a vehicle network 112 in the vehicle 102, e.g., over an Ethernet bus, a CAN bus, a wireless network, etc. Alternatively, or additionally, the memory can be part of the computer, i.e., as a memory of the computer or firmware of a programmable chip.

The one or more computers/ECUs 104 can be included in a vehicle 102 that may be any suitable type of ground vehicle 102, e.g., a passenger or commercial automobile such as a sedan, a coupe, a truck, a sport utility, a crossover, a van, a minivan, etc. As part of an autonomous vehicle (AV) system, computer/ECU 104 may include programming to operate one or more of vehicle 102 brakes, propulsion (e.g., control of acceleration in the vehicle 102 by controlling one or more of an internal combustion engine, electric motor, hybrid engine, etc.), steering, climate control, interior and/or exterior lights, etc., as well as to determine whether and when the computer, as opposed to a human operator, is to control such operations, such as by sending vehicle data over the vehicle network 112. Additionally, a computer/ECU 104 may be programmed to determine whether and when a human operator is to control such operations.

A vehicle computer 104 may include or be communicatively coupled to, e.g., via a vehicle network 112 such as a communications bus as described further below, more than one processor, e.g., included in sensors 108, cameras 107, electronic controller units (ECUs) 104 or the like included in the vehicle 102 for monitoring and/or controlling various vehicle components, e.g., a powertrain controller, a brake controller, a steering controller, etc. The computer is generally arranged for communications on a vehicle 102 communication network that can include a bus in the vehicle 102 such as a controller area network (CAN) or the like, and/or other wired and/or wireless mechanisms. Alternatively, or additionally, in cases where the computer actually includes a plurality of devices, the vehicle network 112 may be used for communications between devices represented as the computer in this disclosure.

A vehicle 102 in accordance with the present disclosure includes a plurality of sensors 108 that may support the AV and climate control functions. For example, sensors 108 may include, but are not limited to, one or more wheel speed sensors, GPS sensor, ultrasonic parking sensor, short range RADAR, medium range RADAR, LiDAR, light sensor, rain sensor, accelerometer, etc. Sensors 108 may also include A/C pressure sensors, air quality sensors (i.e., odor sensors) and/or humidity sensors to support the climate control system. Sensors 108 may also include those under control of a body control module (BCM), such as accelerometers, seatbelt sensors, airbag deployment sensors, and the like.

A vehicle 102 in accordance with the present disclosure includes one or more cameras 107 that may support the AV functions. For example, the camera(s) 107 may include one or more interior cameras to monitor passengers and interior portions of the vehicle 102. The camera(s) 107 may also include one or more exterior cameras, including one or more forward-facing camera that may image the ground in front of vehicle 102, one or more rear-ward facing camera that may image the ground behind the vehicle 102, one or more side-facing camera that may image the ground next to vehicle 102, and/or one or more under-vehicle camera.

The vehicle network 112 is a network via which messages can be exchanged between various devices in vehicle 102. The vehicle computer 104 can be generally programmed to send and/or receive, via vehicle network 112, messages to and/or from other devices in vehicle 102 e.g., any or all of ECUs, sensors, cameras, actuators, components, communications module, a human machine interface HMI, etc. Additionally, or alternatively, messages can be exchanged among various such other devices in vehicle 102 via a vehicle network 112. In cases in which the computer includes a plurality of devices, vehicle network 112 may be used for communications between devices represented as a computer in this disclosure. In some implementations, vehicle network 112 can be a network in which messages are conveyed via a vehicle 102 communications bus. For example, vehicle network 112 can include a controller area network (CAN) in which messages are conveyed via a CAN bus, or a local interconnect network (LIN) in which messages are conveyed via a LIN bus. In some implementations, vehicle network 112 can include a network in which messages are conveyed using other wired communication technologies and/or wireless communication technologies e.g., Ethernet, WiFi, Bluetooth, Ultra-Wide Band (UWB), etc. Additional examples of protocols that may be used for communications over vehicle network 112 in some implementations include, without limitation, Media Oriented System Transport (MOST), Time-Triggered Protocol TTP, and FlexRay. In some implementations, vehicle network 112 can represent a combination of multiple networks, possibly of different types, that support communications among devices in vehicle 102. For example, vehicle network 112 can include a CAN in which some devices in vehicle 102 communicate via a CAN bus, and a wired or wireless local area network in which some device in vehicle 102 communicate according to Ethernet or WI-FI communication protocols.

The vehicle computer 104, other vehicles 122, infrastructure elements 124, and/or drones 126, and/or central computer 120 can communicate via a wide area network 116.

Further, various computing devices discussed herein may communicate with each other directly, e.g., via direct radio frequency communications according to protocols such as Bluetooth or the like. For example, a vehicle 102 can include a communication module 110 to provide communications with devices and/or networks not included as part of the vehicle 102, such as the wide area network 116 and/or other vehicles 122, infrastructure elements 124, and/or drones 126, for example. The communication module 110 can provide various communications, e.g., vehicle to vehicle (V2V), vehicle-to-infrastructure or everything (V2X) or vehicle-to-everything including cellular communications (C-V2X) wireless communications cellular, dedicated short range communications (DSRC), etc., to another vehicle 102, to an infrastructure element typically via direct radio frequency communications and/or typically via the wide area network 116, e.g., to the central computer 120. The communication module 110 could include one or more mechanisms by which a vehicle computer 104 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, DSRC, cellular V2X, CV2X, and the like.

The other vehicles 122, infrastructure elements 124, and/or drones 126 may use any suitable wireless communications, such as cellular or WI-FI, such as to communicate with the central computer 120 via the wide area network 116.

Figure 2:
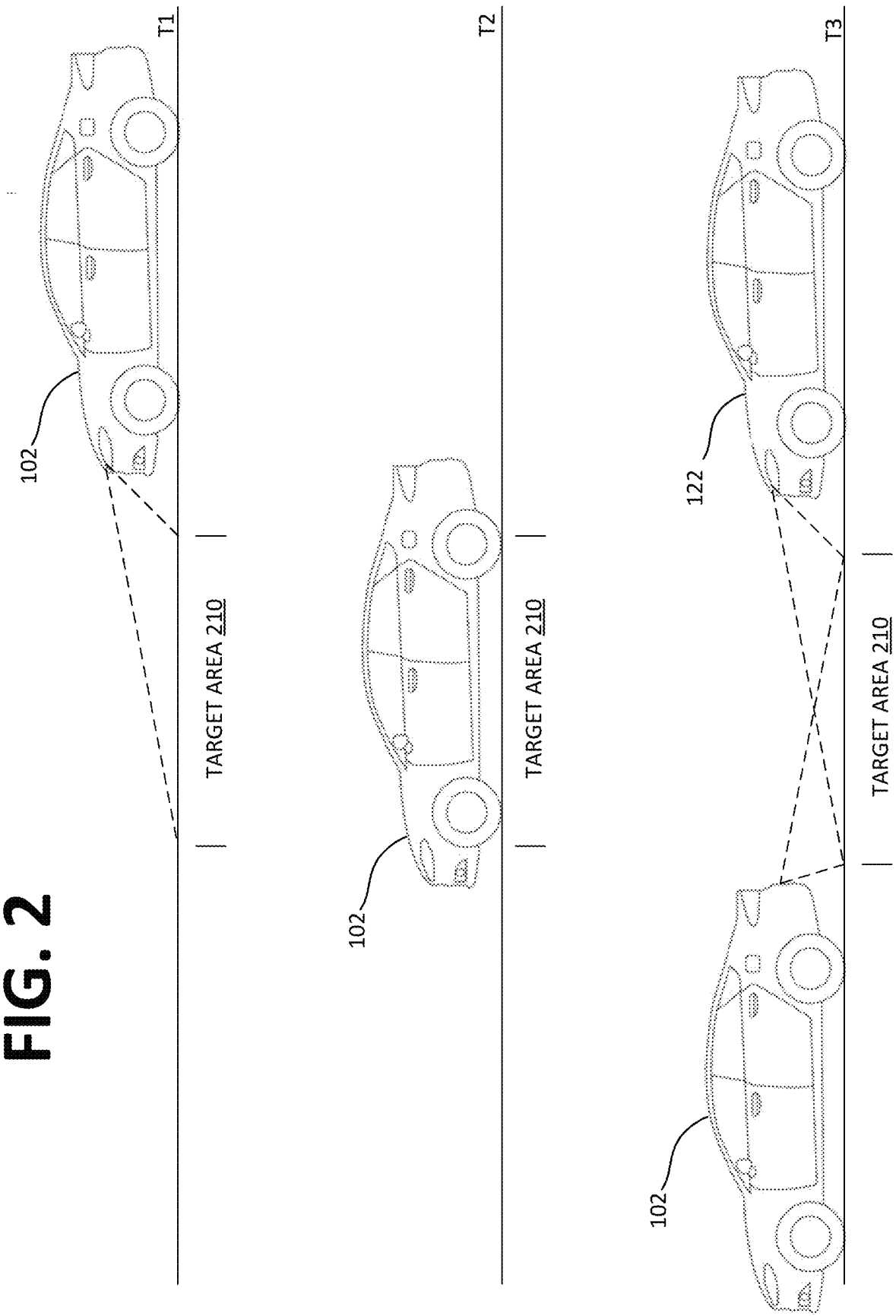
FIG. 2 is a diagram of example diagnostic procedures performed by one or more vehicles.

With reference to FIG. 2, two possible implementations of the present disclosure are illustrated. In one implementation of the present disclosure, an A/C drip valve diagnostic may be performed by vehicle 102 alone after the A/C has been operated for a period of time sufficient to produce condensate (e.g., 10 minutes). At time T1, a vehicle computer 104 in vehicle 102 obtains a first image of a target area 210 in front of the vehicle 102 when the target area is dry from a front-facing camera 107 of vehicle 102. The vehicle 102 then moves over the target area 210 at a time T2, which in this illustration is by moving forward. However, in other implementations, the vehicle computer 104 in vehicle 102 may obtain a first image of a target area 210 in back of the vehicle 102 at time T1 when the target area is dry from a rear-facing camera 107 of vehicle 102, and the vehicle 102 may move over the target area 210 at time T2 by moving in a reverse direction. The vehicle 102 then moves off of the target area 210 at time T3 and the vehicle computer 104 obtains a second image of the target area 210. Although illustrated as moving forward to move off the target area 210 and obtaining the second image form a rear-facing camera 107 in this implementation, it is also possible for vehicle 102 to move backward off the target area 210 and obtain the second image of the target area 210 with the forward facing camera 107. As discussed further below, the vehicle computer 104 may compare the first and second images, such as by image subtraction, to determine if any condensate has been deposited in the target area 210, such as by a puddle or wetting line of droplets that may show up darker (or a different color in infrared) in the second image. In this case, an absence of condensate in the target area 210 may indicate a blocked or otherwise malfunctioning A/C drip valve.

In another implementation illustrated in FIG. 2, the A/C drip valve diagnostic may be performed by vehicle 102 and another vehicle 122 after the A/C in vehicle 102 has been operated for a period of time sufficient to produce condensate (e.g., 10 minutes). At time T1, a vehicle computer 104 in vehicle 102 obtains a first image of a target area 210 in front of the vehicle 102 when the target area is dry from a front-facing camera 107 of vehicle 102. The vehicle 102 then moves over the target area 210 at a time T2 by moving forward. The vehicle 102 then moves off of the target area 210 at time T3 and the vehicle computer 104 obtains a second image of the target area 210 from the forward facing camera 107 of another vehicle 122 over a communication link such as V2V communication. Such an implementation may be useful in a platooning configuration where vehicles 102 and 122 are already in communication with each other, and the present principles may be applied to additional vehicles in the platooning arrangement. As discussed further below, the vehicle computer 104 may compare the first and second images, such as by image subtraction, to determine if any condensate has been deposited in the target area 210, such as by a puddle or wetting line of droplets that may show up darker (or a different color in infrared) in the second image. Again in this case, an absence of condensate in the target area 210 may indicate a blocked or otherwise malfunctioning A/C drip valve in vehicle 102.

Figure 3:
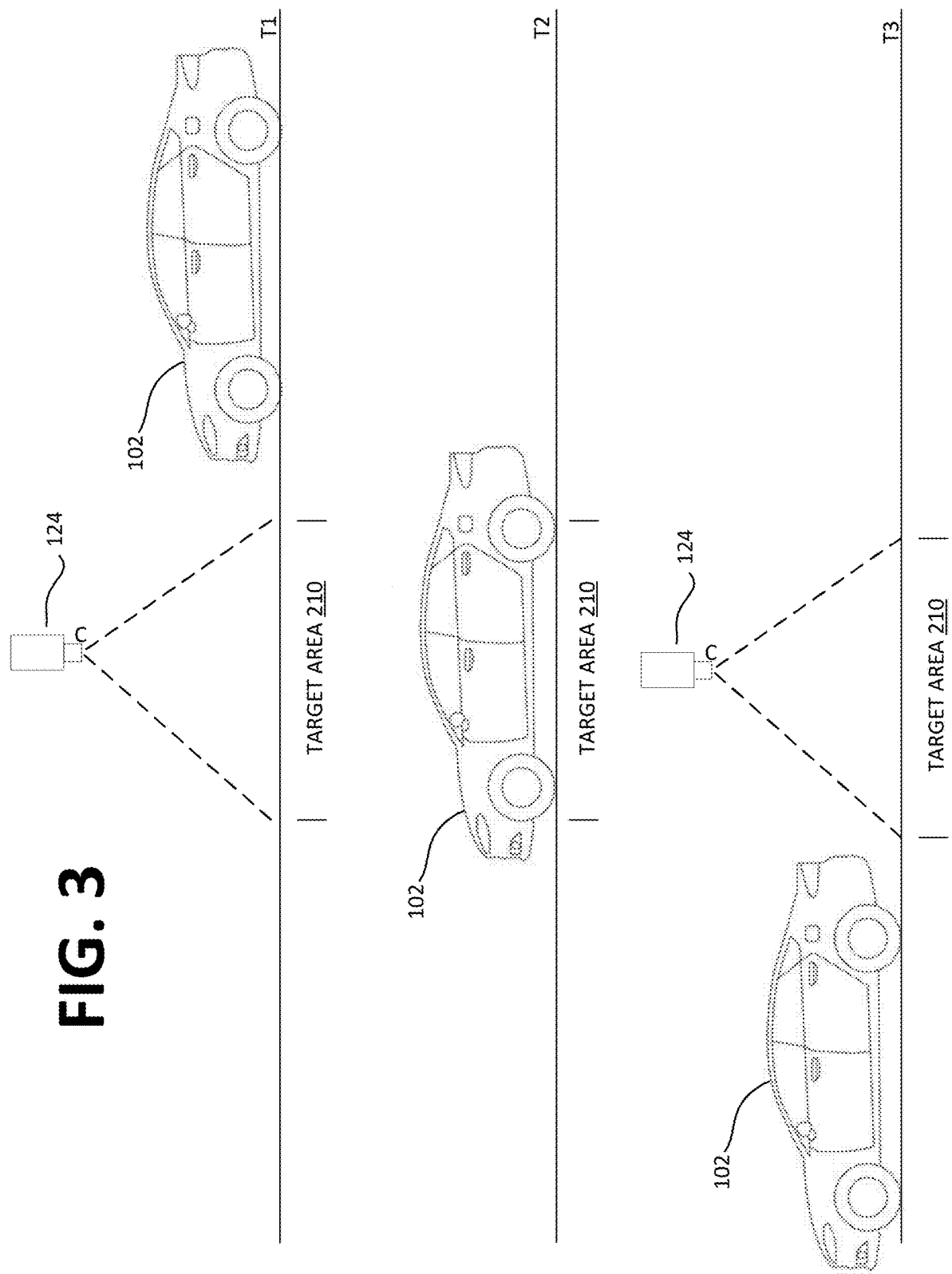
FIG. 3 is a diagram of an example diagnostic procedure performed by an infrastructure element.

With reference to FIG. 3, an additional implementation of the present disclosure is illustrated. In this implementation, an A/C drip valve diagnostic may be performed by an infrastructure element 124 after the A/C in vehicle 102 has been operated for a period of time sufficient to produce condensate (e.g., 10 minutes). At time T1, a computer, such as one within infrastructure element 124 or in communication with infrastructure 124, such as central computer 120, obtains a first image of a target area 210 in front of the vehicle 102 when the target area is dry from a camera mounted on infrastructure element 124. The vehicle 102 then moves over the target area 210 at a time T2, which in this illustration is by moving forward. However, in other implementations, the computer may obtain a first image of a target area 210 from the camera on infrastructure element 124 in back of the vehicle 102 at time T1 when the target area is dry, and the vehicle 102 may move over the target area 210 at time T2 by moving in a reverse direction. The vehicle 102 then moves off of the target area 210 at time T3 and the computer obtains a second image of the target area 210 from the camera on infrastructure element 124. Although illustrated as moving forward to move off the target area 210, it is also possible for vehicle 102 to move backward off the target area 210. As discussed further below, the computer may compare the first and second images, such as by image subtraction, to determine if any condensate has been deposited in the target area 210, such as by a puddle or wetting line of droplets that may show up darker (or a different color in infrared) in the second image. In this case, an absence of condensate in the target area 210 may indicate a blocked or otherwise malfunctioning A/C drip valve in vehicle 102. This infrastructure element-based diagnostic may be useful for AV fleets by having the infrastructure element 124 located at an entrance/exit of a fleet facility or parking lot.

In another implementation of the present disclosure illustrated in FIG. 4, an A/C drip valve diagnostic may be performed by or in conjunction with an aerial drone 126 that has an imaging device after the A/C in vehicle 102 has been operated for a period of time sufficient to produce condensate (e.g., 10 minutes). At time T1, a computer (in the drone 126 or in communication with drone 126, such as central computer 120) obtains a first image of a target area 210 in front of the vehicle 102 when the target area is dry from an imaging device such as a camera mounted on aerial drone 126. The vehicle 102 then moves over the target area 210 at a time T2, which in this illustration is by moving forward. However, in other implementations, the computer may obtain a first image of a target area 210 in back of the vehicle 102 at time T1 when the target area is dry, and the vehicle 102 may move over the target area 210 at time T2 by moving in a reverse direction. The vehicle 102 then moves off of the target area 210 at time T3 and the computer obtains a second image of the target area 210 from aerial drone 126. Although illustrated as moving forward to move off the target area 210, it is also possible for vehicle 102 to move backward off the target area 210. As discussed further below, the computer may compare the first and second images, such as by image subtraction, to determine if any condensate has been deposited in the target area 210, such as by a puddle or wetting line of droplets that may show up darker (or a different color in infrared) in the second image. In this case, an absence of condensate in the target area 210 may indicate a blocked or otherwise malfunctioning A/C drip valve in vehicle 102. This aerial drone-based diagnostic may be useful for AV fleets disposed in a parking lot, wherein a target area for an entire row of AV's may be imaged by a transverse movement of the drone 126 so that a plurality of vehicles 102 may be diagnosed at substantially the same time.

When used for multiple vehicles 102 in succession, the "dry" first image may have condensate from previous vehicles 102, but the computer may look for any additional (i.e., new) condensate using the same image subtraction technique. In such a case, it may be beneficial to use infrared images wherein new condensate may have a greater temperature difference relative to ambient conditions (e.g., cooler than sun-baked pavement and evaporating condensate from earlier vehicles).

Figure 5B:
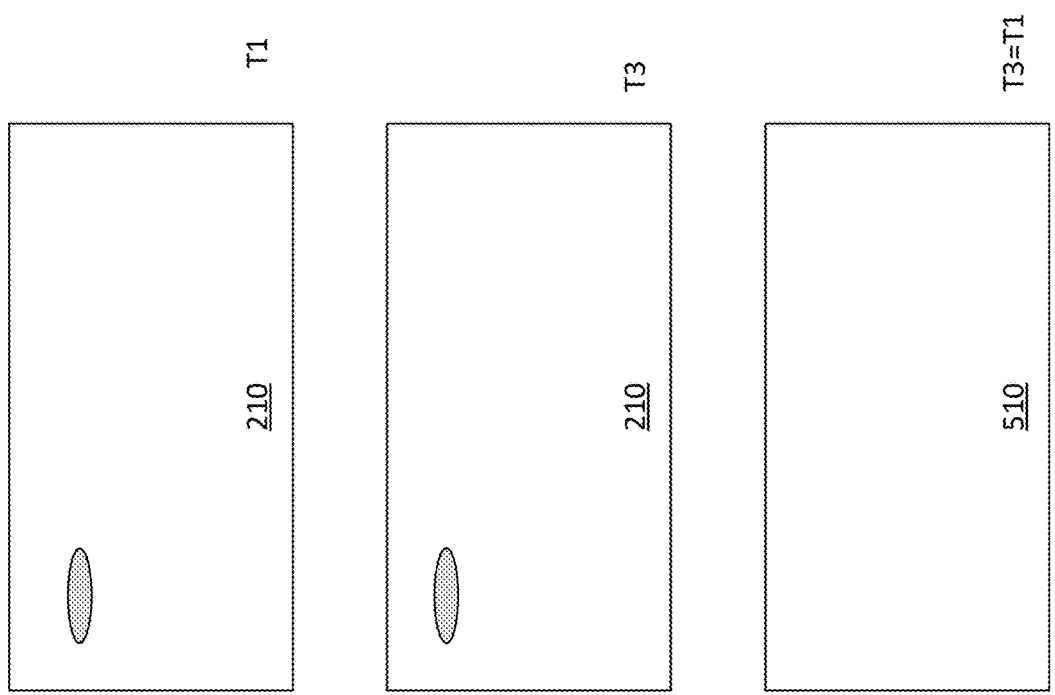
FIGS. 5A and 5B are schematic sets of images of imaging procedures outside of a vehicle.
Figure 5A:
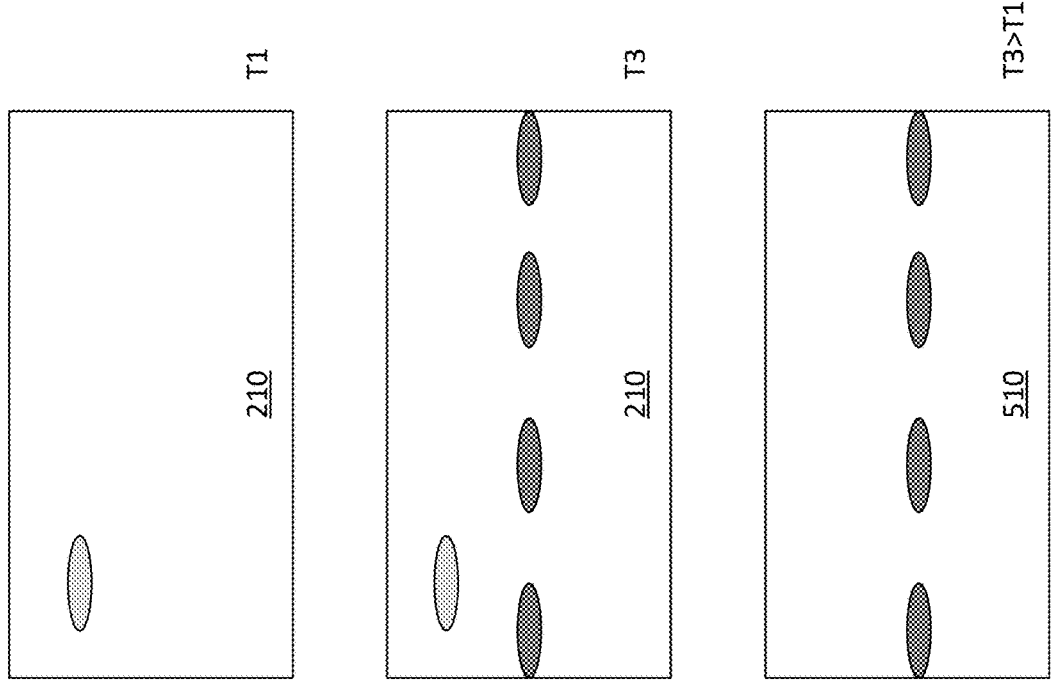

With reference to FIG. 5A, an example of image subtraction in accordance with the present disclosure is illustrated. An image of a dry target area 210 is illustrated at time T1 and an image of the target area 210 after vehicle 102 has passed over the target area 210 at time T2 and deposited condensate (shown as dark droplets of a wetting line) is illustrated at time T3. An image of an image subtraction result 510 is illustrated when the result of the image intensity of dark pixels in the image at time T3 is greater than those at time T1, which in this case is indicative of a functional A/C drip valve.

With reference to FIG. 5B, another example of image subtraction in accordance with the present disclosure is illustrated. An image of a dry target area 210 is illustrated at time T1 and an image of the target area 210 after vehicle 102 has passed over the target area 210 at time T2 is illustrated at time T3. However, in this example, the A/C drip valve is malfunctioning (e.g., clogged) so that no condensate is deposited on the target area 210 at time T2. An image of an image subtraction result 510 is illustrated when the result of the image intensity of dark pixels in the image at time T3 equal to those at time T1, which in this case is indicative of a malfunctioning A/C drip valve.

Figure 6B:
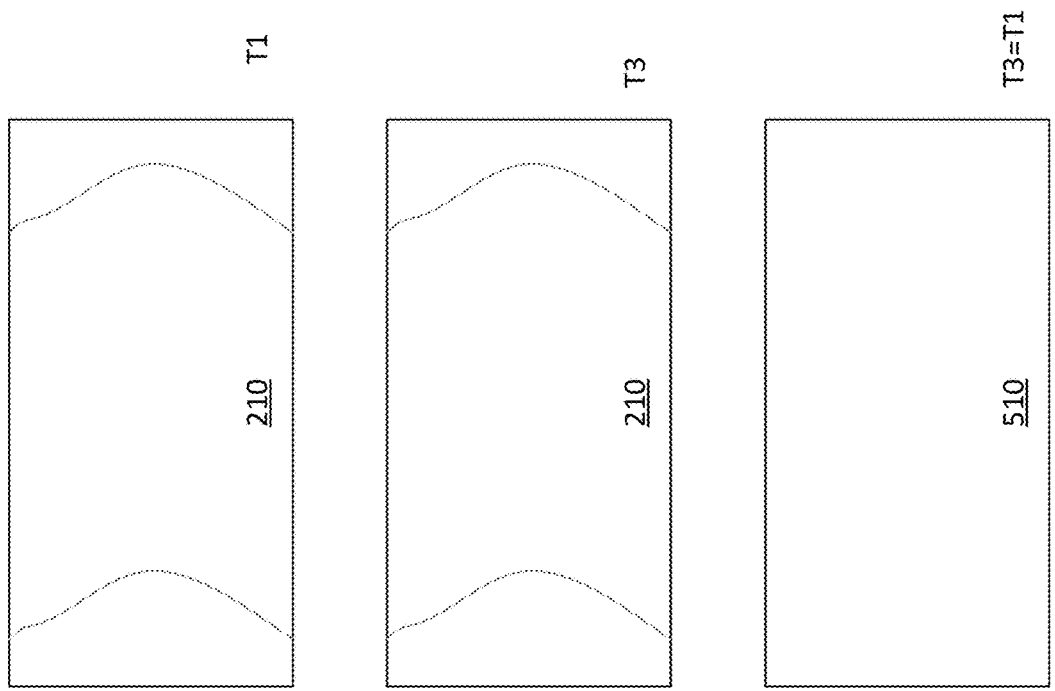
FIGS. 6A and 6B are schematic sets of images of imaging procedures within a vehicle.
Figure 6A:
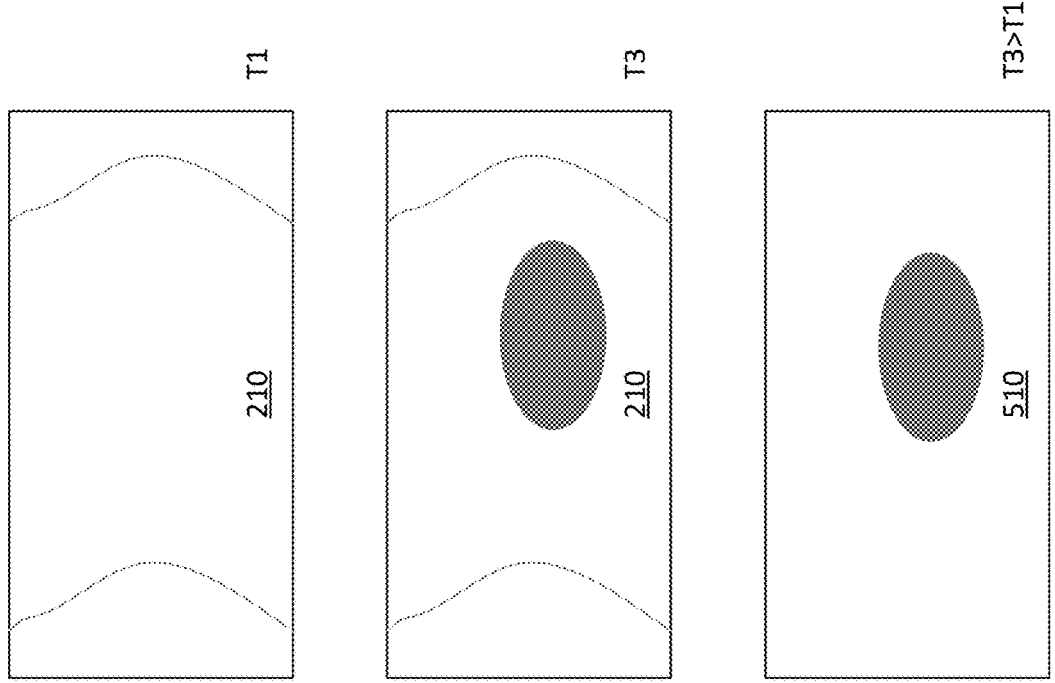

With reference to FIG. 6A, a further of image subtraction in accordance with the present disclosure is illustrated. An image of a dry target area 210 inside of vehicle 102 (e.g., front footwell) is illustrated at time T1 and an image of the target area 210 after the A/C in vehicle 102 has been operating with a malfunctioning A/C drip valve and deposited condensate (shown as a dark puddle) is illustrated at time T3. An image of an image subtraction result 510 is illustrated when the result of the image intensity of dark pixels in the image at time T3 is greater than those at time T1, which in this case is indicative of an A/C drip valve malfunction.

With reference to FIG. 6B, yet another example of image subtraction in accordance with the present disclosure is illustrated. An image of a dry target area 210 is illustrated at time T1 and an image of the target area 210 after the A/C in vehicle 102 has been operating with a functioning A/C drip valve is illustrated at time T3. Since the A/C drip valve has deposited the condensate outside the vehicle, no condensate is deposited on the target area 210 at time T2. An image of an image subtraction result 510 is illustrated when the result of the image intensity of dark pixels in the image at time T3 equal to those at time T1, which in this case indicates a properly functioning A/C drip valve.

Figure 7:
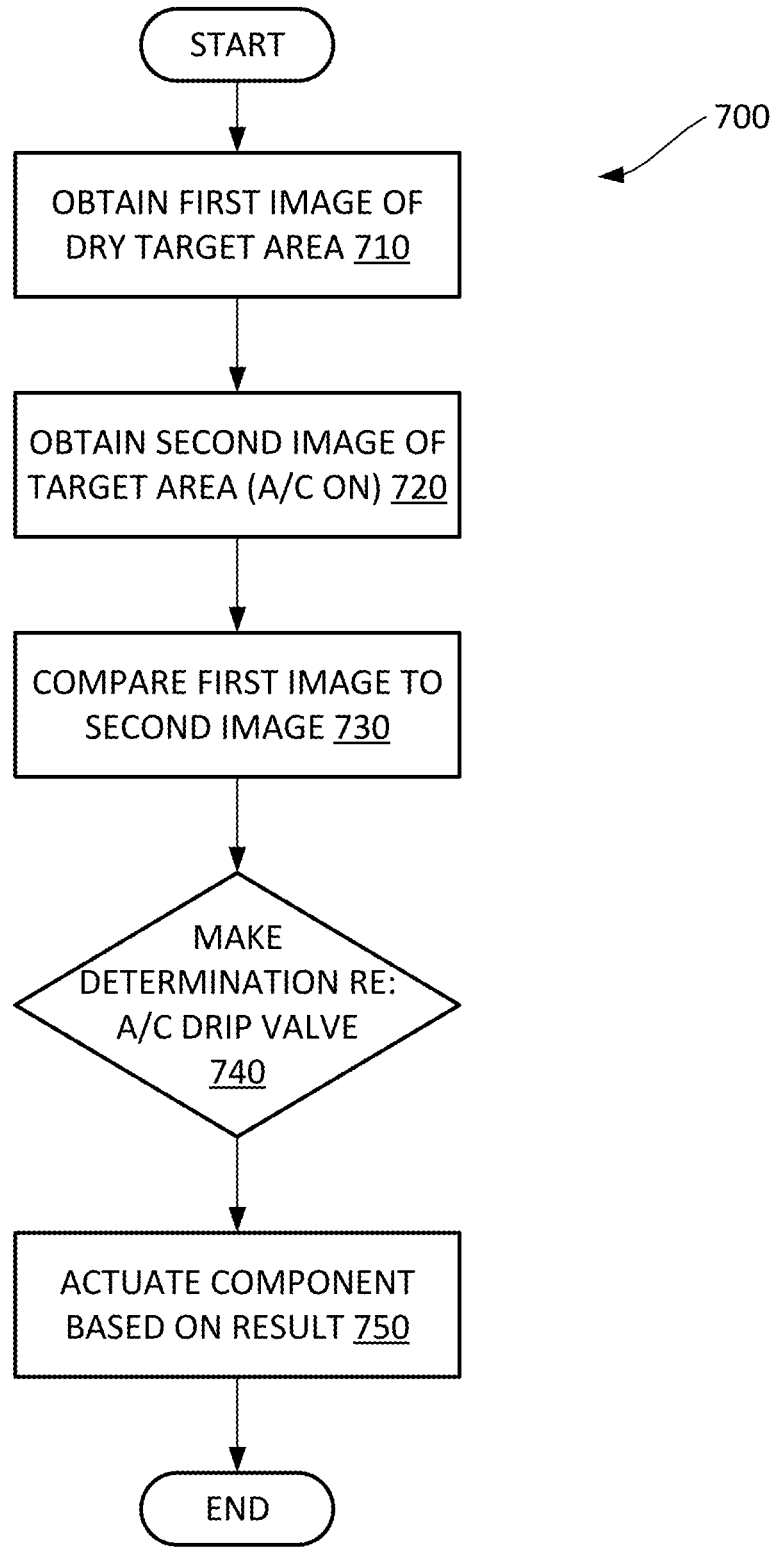
FIG. 7 is a flow chart of an example diagnostic procedure.

With reference to FIG. 7, a flow diagram of a process for implementing the present disclosure is illustrated. The process 700 may be started manually (via the on-board HMI or remotely through the communication module 110) or based upon various triggers. For example, a computer may receive a trigger signal to initiate a vehicle air conditioner (A/C) drip valve diagnostic for a vehicle based upon a vehicle sensor detecting at least one of an A/C pressure drop (e.g., from A/C pressure sensor), unusual humidity (e.g., from an on-board humidity sensor), unusual odor (e.g., from an on-board air quality sensor), a condensate sloshing noise (e.g., from an interior microphone), or expiration of a time period (e.g., from an on-board clock).

In a first block 710, a first image of a target area 210 is obtained when the target area is dry (i.e., not raining or wet at time T1).

The A/C of the vehicle 102 is operated at time T2, and in a next block 720, a second image of the target area 210 is obtained (at time T3).

The computer then compares the first image to the second image at clock 730.

As explained earlier with reference to FIGS. 5A, 5B, 6A, and 6C, the computer can then make a determination regarding the operational status of the A/C drip valve at block 740.

At block 750, the computer can actuate a component based upon the determined result. For example, if it is determined that the A/C drip valve is functioning properly, the computer can reset a timer component or actuate a blower component to permit higher airflow over the evaporator. If it is determined that the A/C drip valve is malfunctioning, the computer may actuate a component such as a relay to disable the A/C system in the vehicle 102. For an autonomous vehicle (AV), the computer may actuate a self-driving component of the AV to have the AV return to a service center.

With reference to FIG. 8, a process flow for an example implementation of an image subtraction process 800 for determination of the presence or absence of condensate is illustrated. In a first block 810, a computer assigns gray scale values to the pixels of the first image. For example, pixels may be assigned a value between 0-5, with 0 being the lightest and 5 being the darkest.

In a next block 820, the computer assigns gray scale values to the pixels of the second image.

In block 830, the gray scale values of the pixels of the first image are summed to obtain a first image intensity.

In block 840, the gray scale values of the pixels of the second image are summed to obtain a second image intensity.

In block 850, the computer compares the first image intensity to the second image intensity.

If the second image intensity is greater than the first image intensity at block 850 (by more than a threshold amount to account for imaging error), the computer determines at block 860 that condensate is present in the second image that was not present in the first image.

If the second image intensity is equal to the first image intensity at block 850 (or different by less than a threshold amount to account for imaging error), the computer determines at block 860 that no new condensate is present in the second image. As noted above, depending on the selected target area 210 (i.e., expected drip location inside or outside of the vehicle 102), the presence or absence of condensate may be used to diagnose the operational status of the A/C drip valve.

While disclosed above with respect to certain implementations, various other implementations are possible without departing from the current disclosure.

Use of in response to, based on, and upon determining herein indicates a causal relationship, not merely a temporal relationship. Further, all terms used in the claims are intended to be given their plain and ordinary meanings as understood by those skilled in the art unless an explicit indication to the contrary is made herein. Use of the singular articles "a," "the," etc. should be read to recite one or more of the indicated elements unless a claim recites an explicit limitation to the contrary.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain implementations and should in no way be construed so as to limit the present disclosure.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system, comprising a computer having a processor and a memory storing instructions executable by the processor to:
    obtain a first image of a target area that is exterior to a vehicle air conditioner (A/C) of a vehicle at a first time when the target area is dry;
    obtain a second image of the target area after operation of the vehicle A/C at a second time after the first time;
    compare the first image to the second image to determine a presence of condensate or an absence of condensate from the vehicle A/C; and
    make a determination whether an A/C drip valve is malfunctioning based upon the comparison and actuate a component based on the determination.

2. The system of claim 1, further comprising instructions to receive a trigger signal to initiate a vehicle air conditioner (A/C) drip valve diagnostic for the vehicle, wherein the trigger signal is received based upon a vehicle sensor detecting at least one of an A/C pressure drop, unusual humidity, unusual odor, a condensate sloshing noise, or expiration of a time period.

3. The system of claim 1, wherein:
the target area is a vehicle support surface,
the first image of the target area is obtained before the vehicle has been located over the target area,
the second image of the target area is obtained after the vehicle has been located over the target area, and
an A/C drip valve malfunction is determined based upon the comparison indicating the absence of condensate from the vehicle A/C.

4. The system of claim 1, wherein at least one of the first image or the second image is captured by a camera on another ground vehicle, an infrastructure camera, or a camera on an aerial drone.

5. The system of claim 1, wherein at least one of the first image or the second image is captured by a camera on the vehicle.

6. The system of claim 1, wherein the computer is disposed in one of the vehicle, another ground vehicle, an infrastructure element, or an aerial drone.

7. The system of claim 2, wherein the instructions to receive a trigger signal include instructions to initiate vehicle air conditioner (A/C) drip valve diagnostics for a plurality of vehicles, and
the first image and the second image for the plurality of vehicles are captured by a camera in an aerial drone.

8. The system of claim 1, wherein the first image and the second image are infrared images.

9. The system of claim 1, wherein the target area is an interior vehicle surface where condensate from the vehicle A/C leaks when the A/C drip valve is clogged, and
an A/C drip valve malfunction is determined based upon the comparison indicating the presence of condensate from the vehicle A/C.

10. The system of claim 1, wherein the instructions to compare the first image to the second image include instructions to:
assign gray scale values to pixels of the first image and the second image, with light pixels assigned a low value and dark pixels assigned a higher value;
sum gray scale values of the pixels of the first image and the second image to obtain a respective first image intensity and a second image intensity;
compare the first image intensity and the second image intensity;
determine the presence of condensate when the second image intensity is greater than the first image intensity by a threshold amount; and
determine the absence of condensate when the second image intensity is not greater than the first image intensity by the threshold amount.

11. A method for detecting a vehicle air conditioner (A/C) drip valve malfunction, comprising:
obtaining a first image of a target area that is exterior to a vehicle A/C of a vehicle at a first time when the target area is dry;
obtaining a second image of the target area after operation of the vehicle A/C at a second time after the first time;
comparing the first image to the second image to determine a presence of condensate or an absence of condensate from the vehicle A/C; and
making a determination whether the vehicle A/C drip valve is malfunctioning based upon the comparison and actuating a component based on the determination.

12. The method of claim 11, further comprising receiving a trigger signal to initiate a vehicle A/C drip valve diagnostic for a vehicle,
wherein the trigger signal is received based upon at least one of detecting an A/C pressure drop, detecting unusual humidity within the vehicle, detecting unusual odor within the vehicle, detecting condensate sloshing noise within the vehicle, or expiring of a time period.

13. The method of claim 11, wherein:
the target area is a vehicle support surface,
the first image of the target area is obtained before the vehicle has been located over the target area,
the second image of the target area is obtained after the vehicle has been located over the target area, and
the A/C drip valve malfunction is determined based upon the comparison indicating the absence of condensate from the vehicle A/C.

14. The method of claim 11, wherein at least one of the first image or the second image is captured by a camera on another ground vehicle, an infrastructure camera, or a camera on an aerial drone.

15. The method of claim 11, wherein at least one of the first image or the second image is captured by a camera on the vehicle.

16. The method of claim 11, wherein the method is performed by a computer in one of the vehicle, another ground vehicle, an infrastructure element, or an aerial drone.

17. The method of claim 12, wherein receiving the trigger signal includes initiating vehicle air conditioner (A/C) drip valve diagnostics for a plurality of vehicles, and
the first image and the second image for the plurality of vehicles are captured by a camera in an aerial drone.

18. The method of claim 11, wherein the first image and the second image are infrared images.

19. The method of claim 11, wherein the target area is an interior vehicle surface where condensate from the vehicle A/C leaks when the A/C drip valve is clogged, and
determining the vehicle A/C drip valve malfunction is based upon the comparison indicating the presence of condensate from the vehicle A/C.

20. The method of claim 11, wherein comparing the first image to the second image includes:
assigning gray scale values to pixels of the first image and the second image, with light pixels assigned a low value and dark pixels assigned a higher value;
summing gray scale values of the pixels of the first image and the second image to obtain a respective first image intensity and a second image intensity;
comparing the first image intensity and the second image intensity;
determining the presence of condensate when the second image intensity is greater than the first image intensity by a threshold amount; and
determining the absence of condensate when the second image intensity is not greater than the first image intensity by the threshold amount.

* * * * *